United States Patent [19]

Kerner et al.

[11] Patent Number: 4,833,888
[45] Date of Patent: May 30, 1989

[54] THERMOELECTRIC HEATING AND/OR COOLING SYSTEM USING LIQUID FOR HEAT EXCHANGE

[75] Inventors: James M. Kerner, 779 Hillgrove Ct., Chico, Calif. 95926; Carl Palmer, 514 Greenview Dr., La Habra, Calif. 90631; Michael A. Reed, San Diego, Calif.; John J. Pagendarm, Chico, Calif.

[73] Assignees: James M. Kerner, Chico; Carl Palmer, La Habra; Paul Toffel, Flintridge, all of Calif. ; a part interest

[21] Appl. No.: 194,404

[22] Filed: May 16, 1988

Related U.S. Application Data

[63] Continuation of Ser. No. 8,647, Jan. 29, 1987, Pat. No. 4,744,220.

[51] Int. Cl.$^4$ .............................................. F25B 21/02
[52] U.S. Cl. ............................................... 62/3.3
[58] Field of Search ............................................... 62/3

[56] References Cited

U.S. PATENT DOCUMENTS

| | | | |
|---|---|---|---|
| 420,641 | 2/1890 | Dewey | 62/3 |
| 2,886,618 | 5/1959 | Goldsmid | 62/3 X |
| 2,910,836 | 11/1959 | Karrer | 62/3 |
| 2,931,188 | 4/1960 | Levit | 62/3 |
| 3,008,299 | 11/1961 | Sheckler | 62/3 |
| 3,008,300 | 11/1961 | Ryan et al. | 62/3 |
| 3,212,274 | 10/1965 | Eidas | 62/3 |
| 3,255,593 | 6/1966 | Newton | 62/3 |
| 3,324,667 | 6/1967 | Muller | 62/3 |
| 4,055,053 | 10/1977 | Elfuing | 62/3 |
| 4,476,685 | 10/1984 | Aid | 62/3 |

*Primary Examiner*—Lloyd L. King
*Attorney, Agent, or Firm*—Cahill, Sutton & Thomas

[57] ABSTRACT

A water purification or filtration system supplies purified or filtered water into an unpressurized, heavily insulated reservoir. A thermoelectric module thermally coupled to the reservoir pumps heat into or out of the reservoir, heating or cooling the purified water. A flow director thermally coupled to the thermoelectric module "shapes" room temperature water, which may be brine wastewater produced by the purification system or tap water diverted from the main water line by an in-line flow restrictor into a thin sheet flowing through a thin passage in the flow directors. Pumped heat from the thermoelectric module thereby is efficiently absorbed by the thin sheets of water, which may be discharged into a drain. A sealed electric pump delivers purified or filtered cooled (or heated) water to a spigot in response to actuating of a control switch.

2 Claims, 3 Drawing Sheets

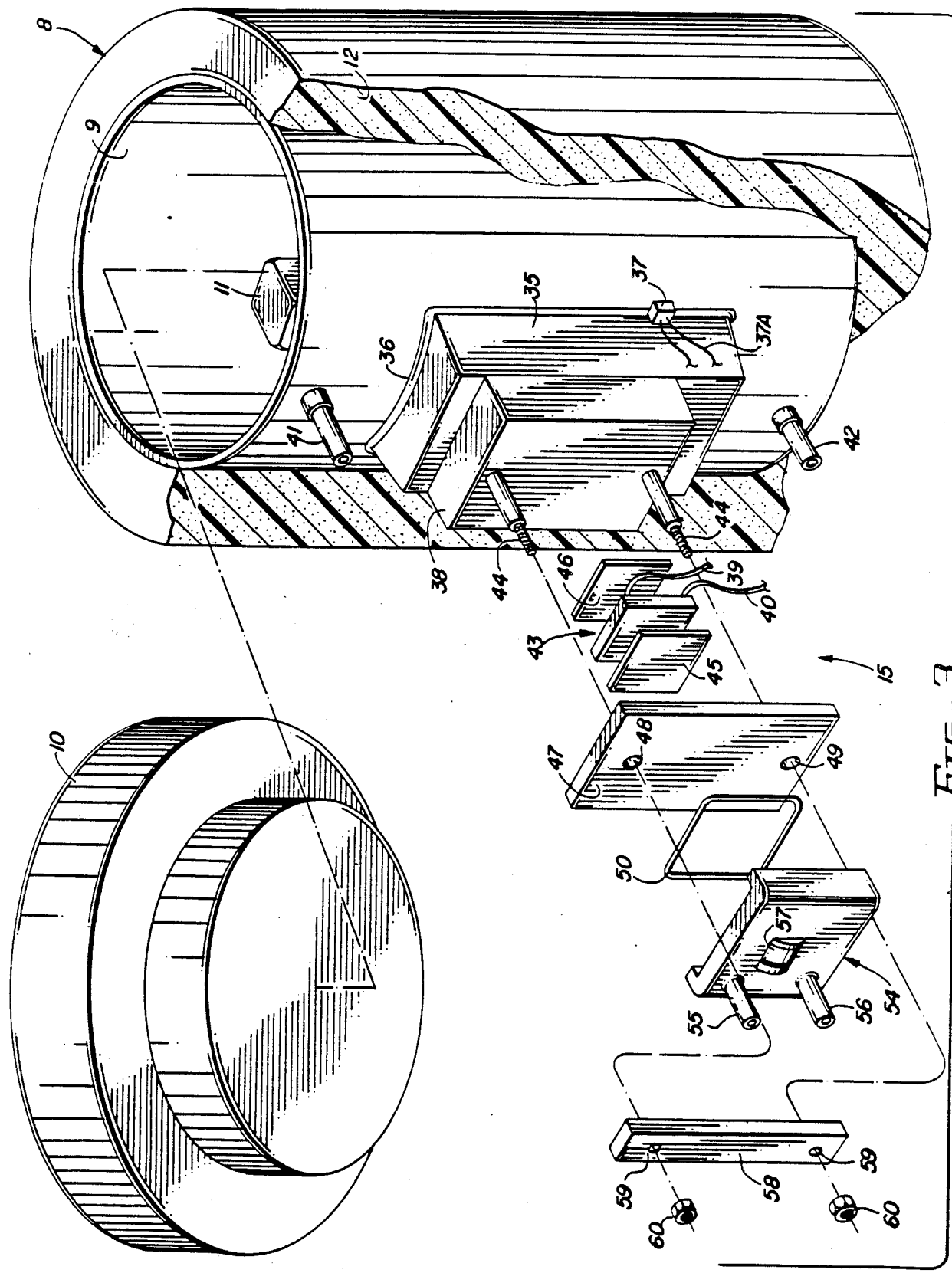

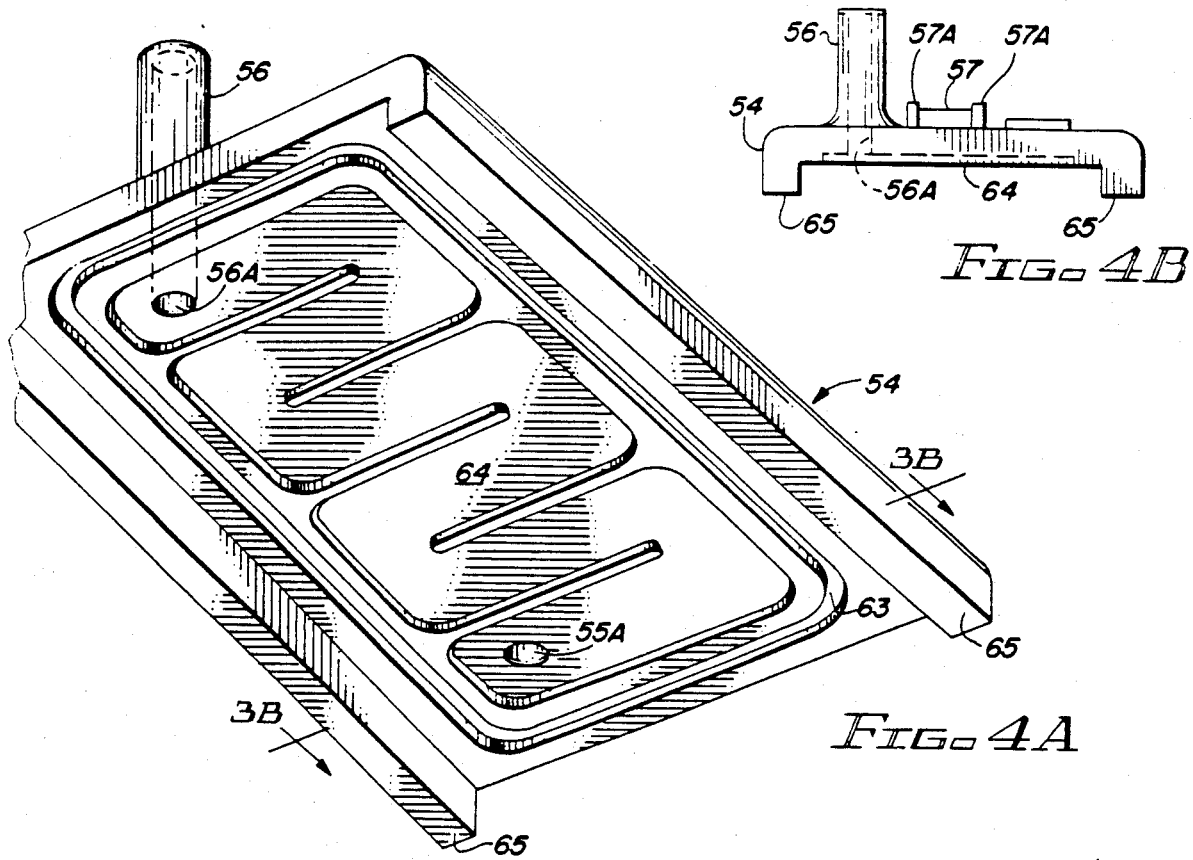
FIG. 4B
FIG. 4A
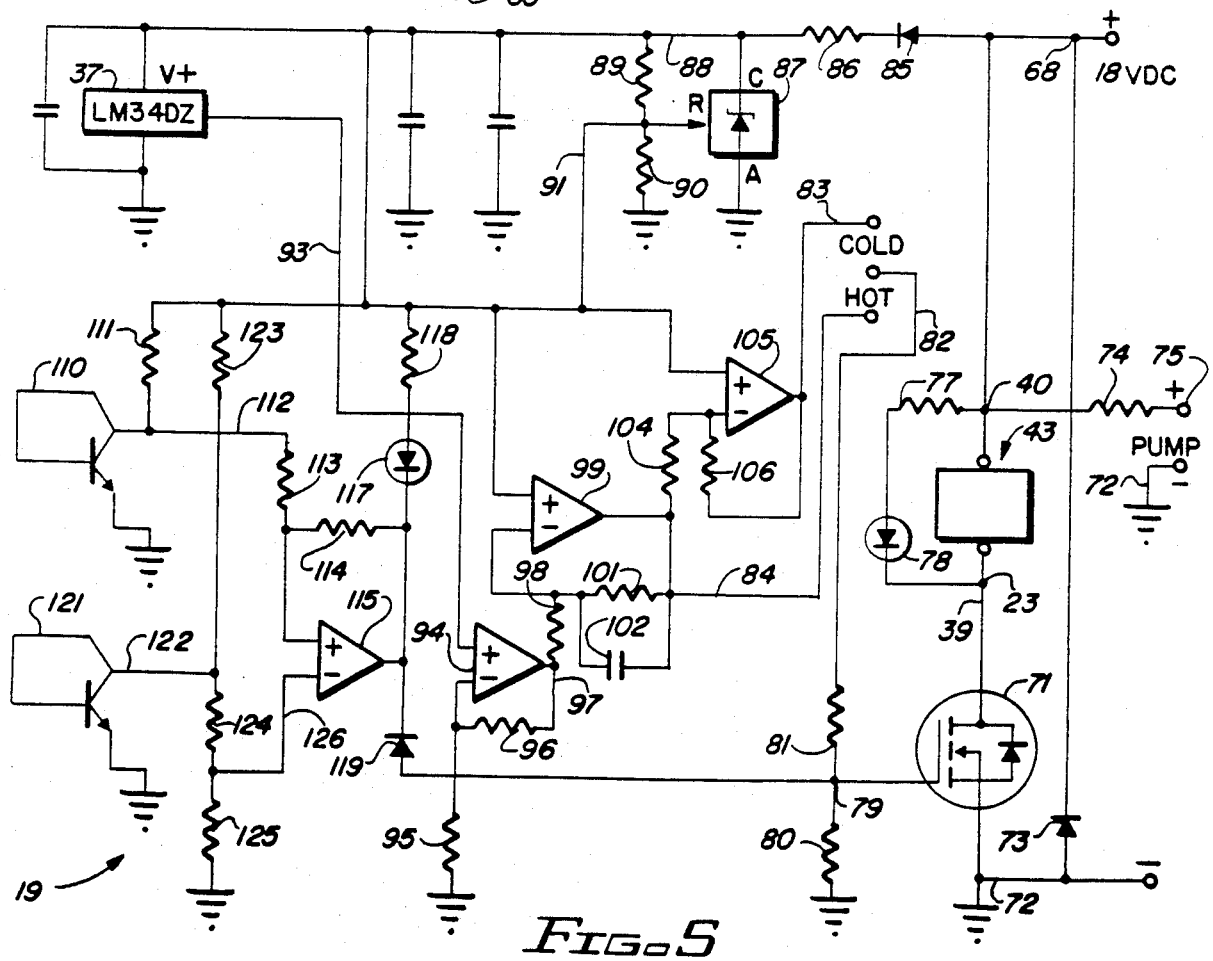
FIG. 5

THERMOELECTRIC HEATING AND/OR COOLING SYSTEM USING LIQUID FOR HEAT EXCHANGE

This is a continuation of application Ser. No. 008,647, filed Jan. 29, 1987, now U.S. Pat. No. 4,744,220.

BACKGROUND OF THE INVENTION

The invention relates to apparatus for cooling and heating purified, filtered or tap water supplied by a standard residential, commercial, or industrial cold water plumbing pipe line, and yet more particularly to techniques for supplying or removing heat pumped to or from the purified, filtered, or tap water by means of a thermoelectric module.

The highest consistently pure water is delivered by the well-known reverse osmosis techniques for water purification, in which pressure applied to water on one side of a semipermeable membrane causes pure water molecules to be forced through the membrane while contaminants and pollutants remain on the other side of the semipermeable membrane and are flushed away in brine wastewater, have been used for residential and commercial water purification systems. The reverse osmosis process removes viruses, bacteria, pyrogens, various compounds, carcinogens, pesticides, insecticides, detergents, radioactive contaminants, up to 98 percent of the dissolved inorganic minerals, silt and sand, and colloidal matter from water. It sometimes is desirable that the seven to eight gallons per day of purified water produced by a under-counter typical reverse osmosis residential water purification unit be stored in an under-counter reservoir and chilled or heated, so that chilled or heated water can be drawn from the reservoir through an above-counter spigot. One apparatus for providing chilled purified water from a reverse osmosis unit includes a reservoir with a thick coating of insulation and a thermoelectric module thermally coupled to the wall of the reservoir. The thermoelectric module, when powered by a suitable power supply, pumps heat out of the reservoir, thus chilling the purified water. An electric fan blows air through a heat exchanger thermally coupled to the other side of the thermoelectric module to remove heat. This device has proven unsatisfactory because of heat buildup in the under-counter region in which the reverse osmosis unit and the reservoir normally are installed, i.e., underneath a kitchen sink. In high ambient temperature operation, the enclosed fan-cooled heat exchanger can fail to adequately refrigerate the water. The device also is noisy and does not function efficiently, although it has been sold in limited numbers.

It is believed that there would be a good market for an improved water purification and/or filtration system with an associated reservoir and heating/cooling system which is more compact than presently-known units, is noiseless, does not excessively heat the under-counter space in which the unit is installed, and which can be installed safely in an entirely closed region.

SUMMARY OF THE INVENTION

Accordingly, it is an object of the invention to provide an improved apparatus and method for removing heat pumped by a thermoelectric module.

It is another object of the invention to provide a water purification and/or filtration system capable of heating and/or cooling which does not heat up the region in which the system is installed.

It is another object of the invention to provide a water purification and/or filtration heating and/or cooling system which does not degrade the efficiency of a reverse osmosis water purification system that supplies purified water to the heating and/or cooling reservoir.

It is another object of the invention to provide a very compact water purification and/or filtration heating and/or cooling system that is protected from overheating of a thermoelectric module if the flow of the water is interrupted.

Briefly described, and in accordance with one embodiment thereof, the invention provides a method and apparatus suitable for efficiently removing or supplying heat pumped by a thermoelectric module out of or into a reservoir by passing water through a flow director that efficiently thermally couples the water to one side of the thermoelectric module. In the described embodiment of the invention, an under-counter purified and/or filtered water dispenser capable of supplying either heated or chilled water may include a reverse osmosis water purification unit that supplies filtered and purified water into an insulated reservoir. The reservoir contains a float valve that stops or limits the flow of filtered water into the reservoir when water therein reaches a certain level. One surface of the thermoelectric module is thermally coupled to a vertical, elongated area of the reservoir by a suitable heat transfer block, the rest of the reservoir being coated with thick insulation. An opposite surface of the thermoelectric module is thermally coupled to a liquid flow director having an inlet receiving brine wastewater from the reverse osmosis purification unit. The flow director guides the brine wastewater through a wide, extremely thin passage so that the brine wastewater is shaped into an extremely thin sheet in thermal contact with the second side of the thermoelectric module. The thin sheet of brine wastewater rapidly absorbs heat from the thermoelectric module. The heat of the brine wastewater is carried through an outlet tube to an under-counter drain pipe. This same flow director may be used with standard filtration system. This can be achieved by replacing the reverse osmosis brine water with a calibrated restricted tap water flow to produce the same high efficiency heat exchange with the thermoelectric module. A sealed electric pump draws purified water from the bottom of the reservoir and pumps it through a tube to an above-counter spigot in response to actuation of an above-counter electric switch that controls the pump motor. A control circuit includes a field effect transistor that controls the flow of current through the thermoelectric module. The gate electrode of the field effect transistor is controlled in response to a temperature sensor mounted at the junction between the wall of the reservoir and a heat transfer block to maintain the temperature of purified water in the reservoir at a preselected temperature. A protection circuit senses the temperature difference between an ambient air temperature sensor and a heat exchanger temperature sensor and shuts off the current to the thermoelectric module while the temperature sensor exceeds a certain value which indicates that the brine wastewater or restricted delivery cooling water flow has been interrupted. BRIEF DESCRIPTION OF THE DRAWINGS FIG. 1 is a diagram illustrating the main components of the wastewater purification and cooling/heating embodiment of the present invention.

FIG. 3 is a partially exploded perspective view of the liquid reservoir, thermoelectric heat pump module, and associated heat exchanging devices in the system of FIG. 1.

FIG. 4A is a bottom perspective view of the inner surface of the brine wastewater flow director utilized to remove or supply heat pumped by the thermoelectric module in the system of FIG. 2.

FIG. 4B is a section view along section line 4B—4B of FIG. 4A.

FIG. 5 is a schematic circuit diagram of a control circuit for the thermoelectric module contained in the system of FIG. 2.

DETAILED DESCRIPTION OF THE INVENTION

Figure 1:
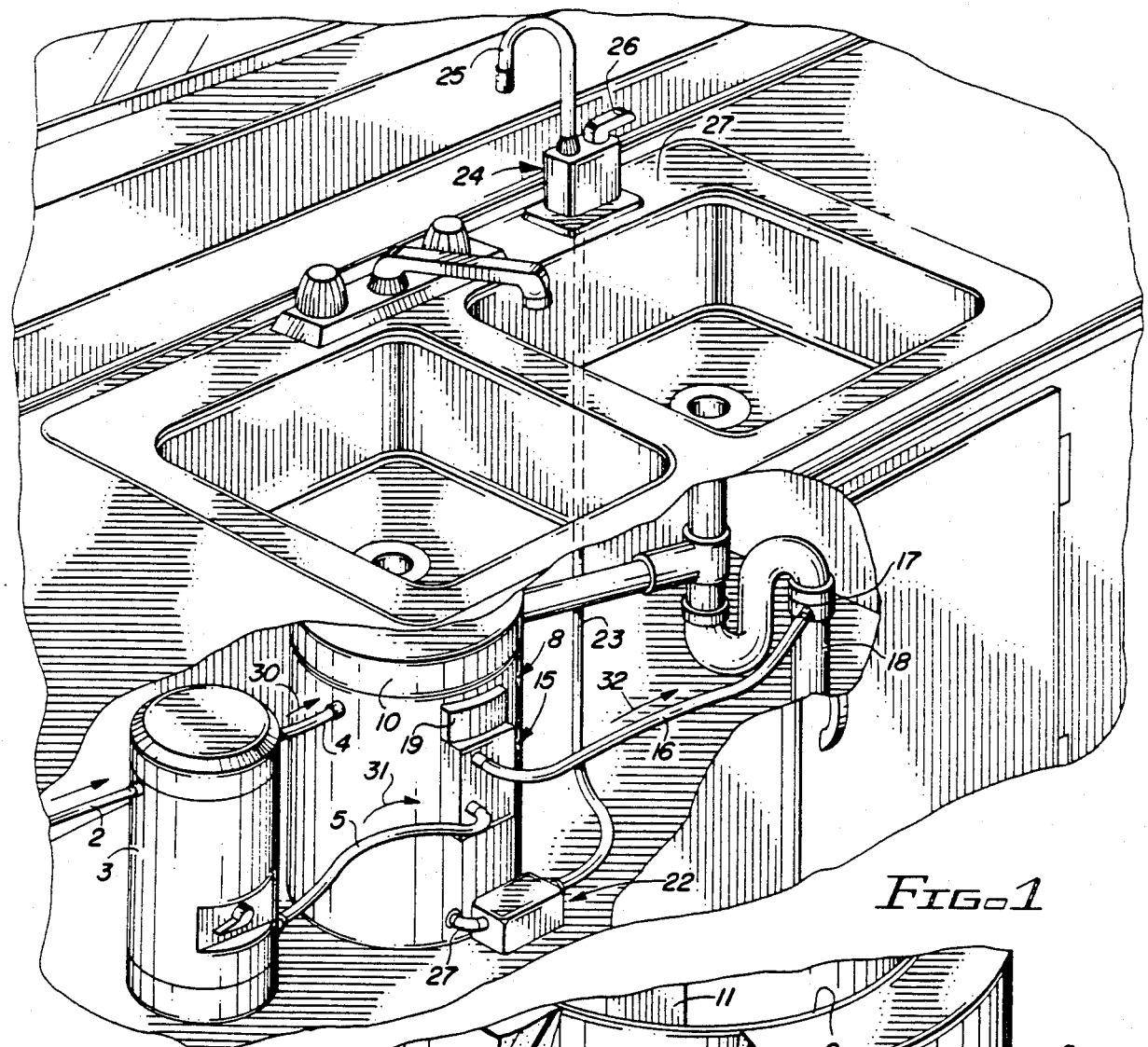

Referring now to FIG. 1, water purification and cooling/heating system 1 includes an inlet tube 2 which typically is connected to a household cold water line underneath a kitchen sink. Inlet tube 2 is connected to the inlet of a conventional reverse osmosis water purification unit 3. A variety of reverse osmosis water purification units suitable for residential use are commercially available. Reverse osmosis unit 3 has a pure water outlet tube 4 that supplies filtered, purified water in the direction of arrow 30 to an inlet of a reservoir 8. Reservoir 8 is heavily insulated with a thick layer of urethane foam insulation designated by reference numeral 12. The level of purified water inside a stainless steel tank 9 of reservoir 8 is limited to a maximum level by a float valve assembly 11. An insulated lid 10 is attached to cover the top surface of reservoir 8.

Figure 2:
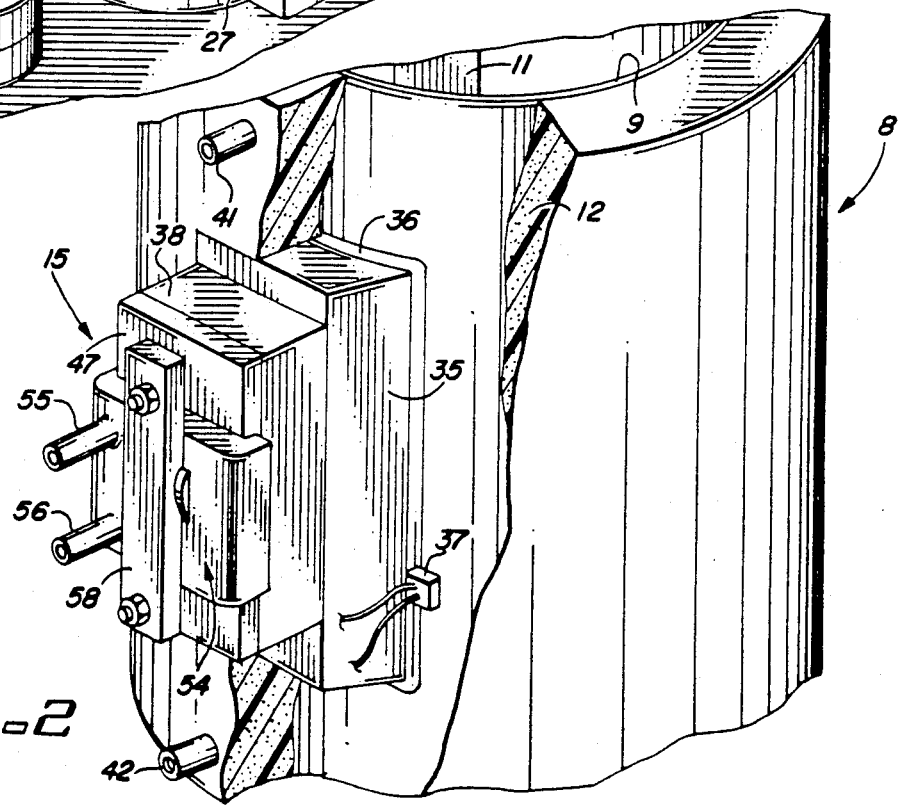
FIG. 2 is a partial cutaway perspective view of the reservoir and thermoelectric apparatus shown in FIG. 1.

A thermoelectric heat pump assembly 15 is thermally coupled to a portion of the wall of stainless steel tank 9 through urethane foam insulation 12. A brine wastewater outlet of reverse osmosis purification unit 3 is coupled by tube 5 to an inlet 56 (FIG. 2) of thermoelectric assembly 15. An electronic circuit 19 controls the operation of the thermoelectric heat pump 15 as subsequently explained. An outlet 55 (FIG. 2) of thermoelectric module 15, is coupled by a tube 16 to a connector 17 that allows tube 16 to discharge into a drain pipe 18.

A sealed electric pump unit 22, which can be one of a variety of commercially-available units, such as a Model 42510-0000 supplied by JABSCO Products, has an inlet coupled by tube 27 to an outlet 42 (FIG. 2) at the bottom of reservoir 8 extending through insulation 12 into the lower portion of tank 9. An outlet of sealed pump 22 is coupled by tube 23 to a spigot unit 24 mounted on the top of a counter 23 above the rest of the water purification system 1. The spigot unit 24 includes a delivery tube 25 and an electric switch control 26 which is coupled by means of suitable conductors (not shown) to the motor of sealed pump unit 22.

Conventional reverse osmosis purification units such as 3 typically deliver seven to eight gallons of purified water per day. The purified water continually flows in the direction of arrow 30 through tube 4 into the upper portion of stainless steel tank 9 until the purified water level reaches a maximum level established by a float valve assembly 11 connected to tube 4.

The reverse osmosis purification unit 3 also continually supplies brine wastewater through outlet tube 5 in the direction of arrow 31 into thermoelectric heat exchanger unit 54 of assembly 15. In accordance with the present invention, the flow director 54 contained in assembly 15 efficiently and rapidly transfers heat pumped from stainless steel tank 9 into the continually flowing brine wastewater, which is discharged through tube 16 into the drain 18. Conversely, if the system 1 is being utilized to heat water in reservoir 8, rather than chill it, the thermoelectric heat pump 15 pumps heat from the brine wastewater, which typically is approximately at or below room temperature, into the stainless steel tank 9 and the purified water therein.

In either case, exchanging pumped heat with the ambient air, and using a thin heat exchanger and an electric fan, as required by the prior art, is avoided. This makes it practical to provide a very compact heat exchanger for reservoir 8 and allows the unit to be mounted in a closed area without fear of any overheating, which could damage the thermoelectric module 43 (FIG. 3).

Referring to FIG. 3, the thermoelectric assembly 15 includes an aluminum saddle block 35 which is made of high thermal conductivity aluminum that is configured to precisely conform to the cylindrical outer surface of stainless steel tank 9. A semicylindrical inner surface of aluminum saddle block 35 is attached to the outer surface of stainless steel tank 9 by means of thermal epoxy, which is readily commercially available.

In the described embodiment of the invention, the diameter of stainless steel tank 9 is 7.313 inches and its heighth is 9.0 inches. The width of the outer surface of the aluminum extender saddle block 35 is 2 inches and its heighth is 7.5 inches. The width of its base is 3.0 inches. The radius of curvature of its inner cylindrical surface is 3.66 inches. The dimensions of aluminum extender block 38 are 3.75 inches by 0.5 inches by 2.0 inches. The dimensions of copper heat exchange plate 47 are 4.25 inches by 0.25 inches by 2.0 inches. The typical pressure applied against flow director 54 by compression beam 58 is 400 pounds. Both of heat transfer blocks 35 and 38 are composed of 6061-T6 aluminum alloy material. The aluminum extender block 38 is attached to the outer surface of saddle block 35 by means of thermal epoxy.

These dimensions were selected to provide relatively optimum thermal exchange of heat between purified water stainless steel tank 9 and thermoelectric module (Peltier device) 43. A layer of thermally conductive film 46 is disposed between the outer surface of extender block 38 and one face of thermoelectric module 43. The thermally conductive films 45 and 46 are available from a variety of sources. Thermoelectric module 43 can be any Peltier device of suitable size and voltage, and can be obtained from Midland Ross of Cambridge, Mass., or Marlow Industries, of Texas.

The outer surface of thermoelectric module 43 contacts a second thermally conductive film 45, which is pressed against it by a copper heat exchange plate 47 having a pair of clearance holes 48 and 49 therein. A threaded stud 44 embedded in the outer surface of aluminum extender block 38 passes through clearance hole 48, and a similar stud 44 passes through clearance hole 49 of extender block 38.

In accordance with the present invention, a water flow director 54 having an O-ring gasket disposed in a groove 63 (FIG. 4A) is pressed against the outer surface of copper heat exchange plate 47 by means of a compression bar 59 the center of which presses against a curved fulcrum 57 on the outer surface of flow director 54.

FIGS. 4A and 4B show a bottom perspective view of flow director 54 which includes in its innerface recess defined by two ridges 65 that extend along either vertical side of copper heat exchange plate 47. O-ring gasket 50 fits into O-ring groove 63, which surrounds a recessed serpentine path 64 that is approximately 15 to 25 mils deep, 0.5 inches wide and 6 inches long. An integral inlet pipe 56A connected to tube 5 has an inlet opening 56A that opens into one end of serpentine path 64. A brine wastewater integral outlet tube 55 connected to drain tube 16 has an opening 55A that opens into the opposite end of serpentine channel 64. Positioning of inlet pipe 56 at the bottom part of the flow director prevents the possibility of bubbles being trapped inside and impeding exchange of heat with the brine wastewater.

The threaded ends of studs 44 extend through clearance holes 59 in the opposed ends of compression bar 58. Nuts 60 are threaded onto the ends of studs 44. The nuts 60 are tightened to cause a predetermined amount of bending of compression bar 58 in order to produce a predetermined amount of force pressing flow director 54 against copper heat exchange plate 47, flattening O-ring 50, so that a thin channel having the depth of serpentine path 64 is provided. The amount of force produced by compression bar 58 is sufficient to provide the necessary sealing of the serpentine channel 64 and also to assure adequately low thermal resistance between the opposite faces of thermoelectric module and the outer face of aluminum extender block 28 and the inner face of copper heat exchange plate 47, respectively, without collapsing thermoelectric module 43.

Thus, it can be seen that brine wastewater flowing through tube 5 from the reverse osmosis water purification unit 3 into the brine water inlet 56 of flow director 54 is diverted into a very thin, relatively fast moving sheet of water moving through and defined by the thickness and width of serpentine channel 64. This has been found to provide rapid exchange of heat between thermoelectric heat pump module 43 and brine wastewater moving in the direction of arrow 31 through tube 5 and through serpentine channel 64 at the rate of one or two gallons per hour, which is the usual output rate of a typical residential type reverse osmosis water purification unit. In our experiments, a temperature difference of only approximately 5 degrees Centigrade occurs between copper heat exchange plate 47 and outgoing brine wastewater.

An absolute temperature sensor 37 is attached by thermal epoxy at the junction between the lower, inner edge of aluminum extender block 35 and the outer surface of the stainless steel tank 9. A pair of conductors 37A connect absolute temperature sensor to thermoelectric module control circuit 19, the circuitry of which is shown in detail in FIG. 5. The location of absolute temperature sensor 37 is selected so that control circuit 19 provides meaningful indication of the absolute temperature of purified water in the lower portion of stainless steel tank 9.

It was found that the location of the absolute temperature sensor 37 is very important to correct operation of the thermoelectric system. Mathematical simulations of the transient temperature response of the system shown in FIG. 2 indicate that the location of temperature sensor 37 must be selected to prevent the temperatures of the heat transfer blocks 35 and 38 from excessively "overshooting" while allowing minimum times to heat or cool the purified water to the predetermined temperature. It should be understood that in order to rapidly cool the water in the stainless steel tank 9, it is necessary for the thermoelectric module 43 to overcool the aluminum extender blocks 38 and 35. Similarly, in the heating mode, to rapidly heat the water in the stainless steel tank, it is necessary for the thermoelectric module to overheat the extender blocks 38 and 35. If such temperature "overshoot" of the extender blocks is too great, there will be enough overheating of one side of the thermoelectric module to exceed the melting temperature of the high thermal conductivity solders utilized in the manufacture of the thermoelectric module, resulting in permanent damage to it. Therefore, temperature sensor 37 needs, in effect, to "sense" both the temperature of the water in the stainless steel tank and the temperature of the aluminum saddle block 35, and the control circuit 19 needs to supply just the right amount of current to the thermoelectric module 43 to cause the transient response of the temperature of the extender blocks, particularly the extender block plate 38 to be critically damped, in the mathematical sense. The illustrated location of temperature sensor 37 has been found to enable the control circuit 19 to drive the thermoelectric module 43 so that critically damped transient temperature response of the extender blocks 38 and 35 occurs, and optimum heating/cooling rates of the purified water are achieved.

It should be appreciated that it is very critical that the hot side of thermoelectric module 43 have a very efficient way of removing heat pumped out of the aluminum extender blocks 38 and 35 and the stainless steel tank 9, with a low temperature drop, in order to get anywhere nearly optimum efficiency in operating the thermoelectric module 43 to chill the purified water in tank 9. This is because a thermoelectric device pumps heat proportionally to the amount of current flowing across it, the temperature difference across it, and the temperature of the hot side of the thermoelectric device. Thus, if the temperature of the hot side of the thermoelectric module 43 becomes very high, it becomes very difficult (i.e., requires a large amount of current, and hence power) to produce a cold temperature on the other side of the thermoelectric module.

Referring next to FIG. 5, control circuit 19 produces the operating voltage applied to terminals 39 and 40 of thermoelectric module 43, and thereby controls the amount of current through it and the amount of heat pumped. Control circuit 19 includes a field effect transistor 71, which can be an MTP3055A unit manufactured by Motorola. Its case is mounted to the top portion of copper heat exchange plate 47. The drain electrode of field effect transistor 71 is connected to conductor 39 of thermoelectric module 43. The other terminal 40 of thermoelectric module 43 is connected to a positive DC power supply voltage of about 11 to 18 volts. The source electrode of field effect transistor 71 is connected to a ground conductor 72. A protection diode 73 has its anode connected to conductor 72 and its cathode connected to the positive power supply voltage conductor 68.

A green light-emitting diode 78 has its cathode connected to conductor 39 and its anode coupled by resistor 77 to conductor 40 of thermoelectric module 43. The brightness of green light-emitting diode 78 indicates the current through, and hence the amount of heat being pumped by thermoelectric module 43.

The gate electrode of field effect transistor 71 is connected by conductor 79 to the junction between resistors 80 and 81. The other terminal of resistor 80 is connected to ground conductor 72. The other terminal of resistor 81 is connected to "jumper" conductor 82, which is connected to conductor 83 if it is desired to cool the purified water in reservoir 8. Alternatively, jumper conductor 82 is connected to conductor 84 if it is desired to heat the purified water in reservoir 8.

Power supply conductor 68 is connected to the anode of a protection diode 85, the cathode of which is coupled by resistor 86 to a conductor 88 on which a regulated voltage is produced by a shunt regulator circuit 87. Shunt regulator 87 is connected between conductor 88 and ground conductor 72, and can be a TL431CLP shunt regulator circuit manufactured by Texas Instruments. A reference control voltage of 2.500 volts is generated by the shunt regulator 87 and a resistive voltage divider circuit including resistor 89, which is connected between conductors 88 and 91, and resistor 90 is connected between conductors 91 and ground to program the TL431 to produce approximately 8 volts on power supply line 88.

A capacitive filter is connected to conductor 88. Conductor 88 also is connected to one terminal of above-mentioned absolute temperature sensor 37, the other terminal of which is connected to ground conductor 72. Temperature sensor 37 produces an output voltage on conductor 93, which is connected to the positive input of an operational amplifier 94, the negative input of which is connected to the junction between resistors 95 and 96. The other terminal of resistor 95 is connected to ground. The other terminal of resistor 96 is connected to conductor 97, which is connected to the output of operational amplifier 94.

Conductor 97 is coupled by resistor 98 to the negative input of operational amplifier 99, the positive input of which is connected to the 2.500 volt reference voltage on conductor 91. The negative input of operational amplifier 99 is also connected by resistor 101 and capacitor 102 to conductor 84, which also is connected to the output of operational amplifier 99. Conductor 84 is coupled by resistor 104 to the negative input of operational amplifier 105. The positive input of operational amplifier 105 is connected to conductor 91. Resistor 106 is connected between the output and the negative input of operational amplifier 105. The output of operational amplifier 105 is connected to conductor 83.

A heat exchanger temperature sensor 110, which can be a 2N3904 transistor, manufactured by Texas Instruments, is mounted on the top portion of the copper heat exchange plate 47. Its emitter electrode is connected to ground conductor 72. Its collector is connected by conductor 112 to the junction between resistor 111 and resistor 113. The other terminal of resistor 111 is connected to conductor 88. The other terminal of resistor 113 is connected to the positive input of operational amplifier 115 and to one terminal of resistor 114. The other terminal of resistor 114 is connected by conductor 116 to the output of operational amplifier 115 and to the cathode of a red light-emitting diode 117. The anode of red light-emitting diode 117 is connected by resistor 118 to conductor 88.

An ambient air sensor 121, which also can be a 2N3904 that is precisely matched to heat exchanger sensor 110, is mounted on printed circuit board 19 and is open to ambient air. Its emitter is connected to ground, and its collector is connected by conductor 122 to the junction between resistors 123 and 104. The other terminal of resistor 123 is connected to conductor 88, and the other terminal of resistor 124 is connected by conductor 126 to the negative input of operational amplifier 115. The other terminal of resistor 125 is connected to ground.

Field effect transistor 71, being connected in series with thermoelectric module 43, acts as a linear control element to regulate the flow of current through thermoelectric module 43 when the temperature of absolute temperature sensor 37 gets close to the preselected temperature, which is 42 degrees Fahrenheit for the cooling mode and 190 degrees Fahrenheit for the heating mode. Assuming the device is connected in a cooling, rather than heating mode, field effect transistor 71 is initially turned fully on. Its series resistance is very low, only about 0.15 ohms, and it allows approximately 3 amperes to flow through thermoelectric module 43. The voltage across field effect transistor 71 therefore is extremely low, and power dissipation in the field effect transistor is minute. As the temperature of the purified water falls (as sensed by temperature sensor 37) and begins to closely approach the preset temperature established by the value of resistors 95 and 96, control circuit 19 begins to reduce the magnitude of the gate to source voltage of field effect transistor 71, and substantially increases its channel resistance, thereby increasing the drain to source voltage, reducing the current flowing through the thermoelectric module 43, and substantially increasing the amount of power dissipated in field effect transistor 71.

This power is dissipated into copper heat exchange plate 47, along with the heat transconducted through conductive film 45 from the thermoelectric module 43. Since under these conditions, control circuit 19 is "throttling back" or reducing the amount of heat pumped out of steel tank 9 by thermoelectric module 43, the removal of heat from copper heat exchange plate 47 and flow director 54 by brine wastewater flowing therethrough no longer needs to be as efficient, the increased amount of heat conducted from field effect transistor 71 into the copper heat exchange plate, and resulting loss in heat pumping efficiency does not hurt the overall system operation.

Table 1 is a list of resistor values for the control circuit 19 of FIG. 5.

TABLE 1

| Resistor | Kilohms |
| --- | --- |
| 74 | 5 ohm 5 watt |
| 77 | 1.0 |
| 80 | 1000 |
| 81 | 10 |
| 86 | 220 ohm .5 watt |
| 89 | 27 |
| 90 | 12 |
| 95 | Cold: 22.1; Hot: 316 |
| 96 | 100 |
| 98 | 2.0 |
| 101 | 100 |
| 104 | 10 |
| 106 | 100 |
| 111 | 7.5 |
| 113 | 270 ohm |
| 114 | 1000 |
| 118 | 2.0 |
| 123 | 6.8 |
| 124 | 12 |

TABLE 1-continued

| Resistor | Kilohms |
| --- | --- |
| 125 | 100 |

The basic operation of the thermoelectric module control circuit 19 is that the circuitry including absolute temperature sensor 37, operational amplifiers 94, 99, and 105 and field effect transistor 71 initially cause a maximum current to flow through thermoelectric module 43 so that it pumps heat at its maximum rate into or out of the steel tank 9 until its measured temperature comes close to the desired preselected temperature (i.e., 42 degrees Fahrenheit if the circuit is connected in the cooling mode or 190 degrees Fahrenheit if the circuit is connected in the heating mode).

The temperature sensor 37, which can be an LM34DZ manufactured by National Semiconductor, produces an output voltage equal to 10 millivolts per degree Fahrenheit. Therefore, the voltage on conductor 93 is 0.42 volts if the temperature at the intersection of the extender block 35 and steel tank 9 is 42 degrees Fahrenheit for the cooling mode operation. For cooling mode operation, resistor 95 is selected so that the voltage $V_{97}$ on conductor 97 is 2.5 volts if sensor 37 is 42 degrees Fahrenheit. If the circuit is connected in the heating mode, and temperature sensor 37 is 190 degrees Fahrenheit, the voltage on conductor 93 is 1.90 volts, and the value of resistor 95 is selected so that $V_{97}$ is 2.5 volts.

If the temperature of sensor 37 increases, $V_{97}$ increases, and if the temperature decreases, $V_{97}$ decreases. In any case, is applied to the negative input of operational amplifier 99 and compared with the reference voltage of 2.5 volts on conductor 91. $V_{84}$ increases or decreases inversely proportionally to the temperature of sensor 37.

In the heating mode, conductor 82 is connected to conductor 84, so as the temperature of the sensor 37 increases close to 190 degrees, $V_{84}$ gradually decreases, gradually turning off field effect transistor 71 enough to maintain the temperature of sensor 37 precisely at 190 degrees Fahrenheit, with an accuracy of less than one degree In the event that the circuit is connected in the cooling mode, conductor 82 is connected to conductor 83. The voltage $V_{83}$ on conductor 83 increases or decreases in the same direction as the temperature of sensor 37. If the temperature of sensor 37 is gradually decreasing and closely approaches 42 degrees Fahrenheit, $V_{83}$ decreases, gradually turning off field effect transistor 71 until the current flowing through thermoelectric module 43 causes it to pump exactly enough heat out of steel tank 9 to maintain the temperature of sensor 37 at exactly 42 degrees Fahrenheit, with an accuracy of less than one degree.

The circuitry including diode connected transistors 110 and 121 operates as a failure protection circuit to turn off field effect transistor 71 in the event that the difference between ambient air temperature and the temperature of the copper heat exchange plate 47 exceeds a certain value, for example, about 50 degrees Fahrenheit. Operational amplifier 115 connected as shown operates as a comparator with hysteresis, and is triggered if the emitter-base voltage of transistor 110 drops enough due to increasing temperature of the copper heat exchanger plate 47 (on which transistor 110 is thermally mounted) to switch the state of the operational amplifier 115, causing its output voltage on conductor 116 to drop from a normally high level to a low level, turning on diode 119, which is normally off, and thereby turning off field effect transistor 71.

This condition normally will occur only if the flow of brine wastewater through the flow director 54 is interrupted so that the copper heat exchange plate 47 overheats to a temperature of roughly 50 degrees Fahrenheit above the ambient air temperature. As soon as the brine wastewater flow resumes, operational amplifier 115 switches back to produce a high level on conductor 116, turning off diode 119, and allowing field effect transistor 71 to be controlled in its normal linear regulation mode to regulate the amount of heat pumped into or out of stainless steel tank 9 by thermoelectric module 43.

The above-described water purification and heating/cooling system economically provides from a countertop spigot a continuous supply of fresh, medically pure water having therein very low dissolved solid content at a low 42 degree Fahrenheit, room temperature or high 190 degree Fahrenheit temperature, depending on the preference of the user. It is estimated that electrical power consumption per year would be only about $14.00, for electricity costing $.08 per kilowatt hour. Very high reliability is achieved due to the fact that no moving parts, such as a fan, are required to supply or remove pumped heat. The device can be installed in a closed space under a countertop with no air ventilation. The described design of the aluminum extender blocks minimizes vertical temperature stratification of purified water in the stainless steel tank, allowing successive withdrawal of water of approximately the same temperature from the tank up to an amount nearly equal to the volume of the tank. The control circuit provides linear proportional control to the thermoelectric module to minimize the amount of power consumed compared to that which would be consumed by an "on-off" type of thermoelectric module control. The red light-emitting diode indicator 117 indicates a "fault" status brought on by an overheating condition of the heat exchanger. The described shutdown circuits prevent damage to the thermoelectric module either in the cooling or heating mode caused by stoppage or interruption of water pressure to the reverse osmosis purification unit. The brightness of the green light-emitting diode 78 provides an immediate visual indication of the amount of heat being pumped.

It should be noted that the system shown in FIG. 1 does not produce back pressure resisting the flow of purified water through tube 4 until the water level reaches a maximum level that shuts float valve assembly 11 off. Optimum efficiency of the reverse osmosis water purification unit 3 is thereby achieved.

While the invention has been described with respect to a number of embodiments, those skilled in the art will be able to make various modifications to the described embodiment without departing from the true spirit and scope of the invention. It is intended that all structures and techniques which are equivalent to those described herein in that they perform substantially the same function in substantially the same way to achieve the same result are within the scope of the invention. For example, the reservoir and thermoelectric assembly can be used in conjunction with a typical commercially available under-counter filter system instead of the reverse osmosis unit. In this case, a simple Y-branch is provided in the outlet line of the filter, with one line connected to the tank and one line connected to a flow restrictor to supply about one and one-half gallons per hour of water to the flow direction inlet.

What is claimed is:

1. A method for heating or cooling a first heat exchanging element to a first temperature, comprising the steps of:
    (a) pumping heat into or out of the first heat exchanging element by means of a thermoelectric module having a first surface that is thermally coupled to the first heat exchanging element and from or to a second surface of the thermoelectric module;
    (b) conducting the pumped heat to or from the second surface of the thermoelectric module by forcing a liquid having a second temperature to flow through the passage in a second heat exchanging element that is thermally coupled to the second surface of the thermoelectric module, the first temperature being different than the second temperature;
    (c) shaping the liquid into a thin sheet within the passage to increase the rate of exchange of heat between the liquid and the second heat exchanging element, and producing turbulence in the thin sheet to increase the rate of exchange of heat between the liquid and the second heat exchanging element to thereby cool or heat the first heat exchanging element to the first temperature without overcooling or overheating ambient air.

2. An apparatus for heating or cooling a first heat exchanging element to a first temperature, comprising in combination:
    (a) thermoelectric heat pumping means for pumping heat, and having a first surface and a second surface;
    (b) means for thermally coupling the first surface of the thermoelectric heat pumping means to the first heat exchanging element;
    (c) a second heat exchanging element thermally coupling the second surface of the thermoelectric heat pumping means to a liquid having a second temperature, the first temperature being different than the second temperature, the second heat exchanging element including a passage having an inlet and an outlet, wherein the passage is relatively thin and wide and shapes the liquid into a thin sheet within the passage to increase the rate of exchange of heat between the liquid and the second heat exchanging element; and
    (d) means for forcing the liquid to flow into the inlet of the passage.

* * * * *